July 4, 1961  R. D. HEFFELFINGER ET AL  2,990,713
MULTI-PURPOSE FRICTION TESTER
Filed March 20, 1957

United States Patent Office 2,990,713
Patented July 4, 1961

2,990,713
MULTI-PURPOSE FRICTION TESTER
Robert D. Heffelfinger, Lansdowne, and Joseph A. Truitt, Wallingford, Pa., assignors to American Viscose Corporation, Philadelphia, Pa., a corporation of Delaware
Filed Mar. 20, 1957, Ser. No. 647,389
2 Claims. (Cl. 73—9)

The invention relates to the field of material testing, and particularly to an apparatus for determining the frictional properties of various materials of like or unlike character.

The invention, as described herein, lends itself well for use in many varied fields, both as a research tool and a production control means, but has particular utility in the textile industry as a replacement for the manual hand testing procedures customarily employed. In the production of textiles, the frictional properties of the fibers depend primarily on the finish applied to the fibers, and exert a very strong influence on the ease with which a fiber will process through the various textile operations, such as flock cutting, Pacific converting, carding, drafting, etc. Further, since all the various textile fibers will not undergo the same finishing treatments or be subjected to the same manufacturing conditions, it is highly desirable, if not necessary, to accurately determine or predict the probable textile processing behavior of any particular type of fiber. With this information, the finish treatments and the conditions of manufacture, or alternatively, the textile processing equipment can then be so adjusted as to insure that the particular fibers are processed in the most efficient and satisfactory manner. Accordingly, a primary object is to provide a new or generally improved and more satisfactory apparatus for determining the frictional properties of various materials.

Still another object is the provision of an apparatus for determining the static and dynamic frictional properties and the stick-slip phenomena of different materials under various conditions of speed and pressure.

A further object is to provide an apparatus capable of urging independent portions of a test sample relative to each other, and including means adapted to transmit and record the frictional reactions resulting from such movement.

A still further object is the provision of a reliable test apparatus which is simple and economical in construction and use.

These and other objects and advantages of the invention will be apparent from the following description and accompanying drawing in which.

Figure 1:
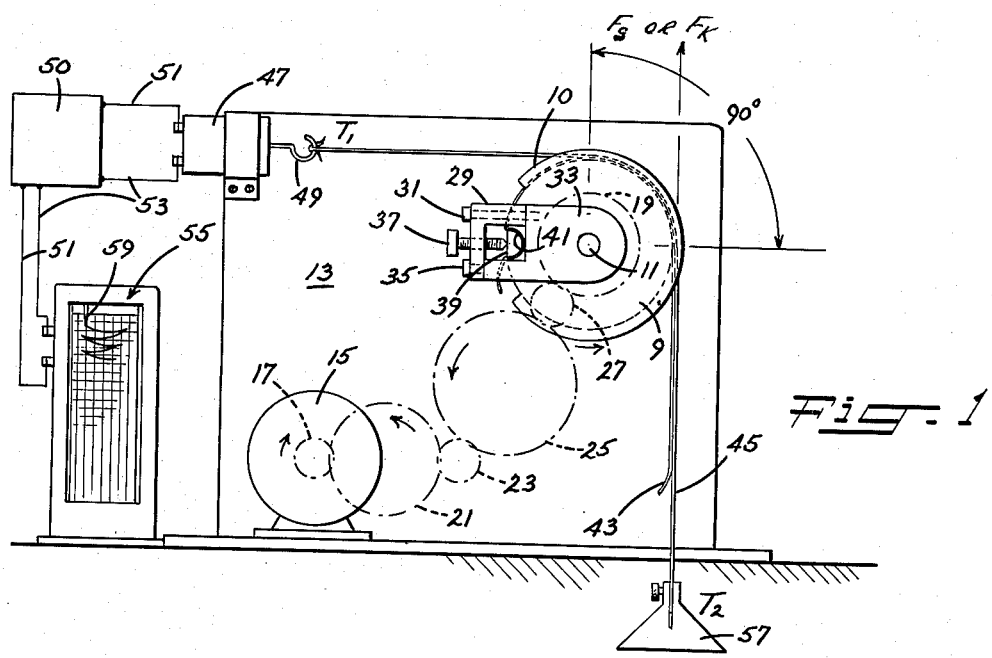
FIGURE 1 is a diagrammatic side view of the apparatus of the present invention.

Briefly, the invention relates to the measurement of the frictional properties of various materials, and is especially useful in determining the inter-fiber dynamic and static frictional properties and stick-slip characteristics of textile fibers. Fundamentally, the invention operates on the principle of a brake band, and in practice the sample under test is composed of two parts which are pressed together with a known pressure and moved relative to each other. In effect, the two sample parts represent a brake drum and belt, and the resistance to the movement of the parts relative to each other is measured and recorded. It will be apparent that the sample parts may consist of the same or different materials.

For a more detailed description of the invention, reference is made to the drawing wherein 9 represents a drum secured to a shaft 11 which is rotatably mounted on a fixed support 13. The drum 9, if desired, may be provided with flanges 10 at its opposite ends to prevent lateral displacement of the sample therefrom. A synchronous motor 15, having a gear 17 secured to its output shaft, drives a gear 19 fixed to the shaft 11 through a train of change gears diagrammatically illustrated at 21, 23, 25, and 27. The change gears are necessarily high quality precision built units to avoid the introduction of errors into the measurements. In testing fiber samples for stick-slip or static frictional properties, as described hereafter, the drum 9 is preferably rotated at a surface speed ranging from 0.25 to about 10.0 inches per minute.

A pair of clamp plates 29 are pivotally mounted by studs 31 to frame members 33 which are fixed to the shaft 11 adjacent the opposite ends of the drum 9. The clamp plates 29 are adapted to be rotated toward and away from their clamping position shown in FIGURE 1, and are provided at their free ends with a notch which permits the plates 29, in their clamping position, to extend beneath the heads of the studs 35 fixed to frame members 33. A locking screw 37 is threaded through each of the clamp plates 29 for engagement with a locking bar 39 which is received within the arcuate-shaped groove 41 formed in the periphery of the drum 9, substantially parallel to its axis. As more fully explained hereinafter, the locking bar 39 and the drum arcuate groove 41 cooperate to securely attach an end portion of one of the sample parts, shown at 43, to the drum at the start of the testing procedure. It will be understood that other means may be utilized in securing the sample to the drum 9, and further, the drum may constitute a plain cylindrical member having an unbroken periphery.

Another part 45 of the sample undergoing testing is connected at one end to a conventional strain measuring head 47 by a sample fastening hook 49, the latter of which is preferably located along a plane tangent to the drum periphery. By means of a suitable electronic circuit including an amplifier 50 and wires 51 and 53, the measuring head 47 is electrically connected to a chart recorder of conventional construction and diagrammatically illustrated at 55. To the opposite end of the sample part 45 is clamped a weight 57 which functions to press the two sample parts together with a known pressure.

In preparing the above described apparatus for one form of test procedure, the recorder 55 is first calibrated by using weights 57 of 2000 and 4000 grams, and the controls are adjusted to restrict the movement of the recorder pen 59 between the chart limits. Preferably, the zero reading of the chart is at its left edge, for example as shown in the chart 61 of FIGURE 2. The drum 9 is then disengaged from the train of change gears and one end of the sample 43 is attached to the drum periphery by the locking bar 39 and screw 37. When testing, for example, continuous fibers, the sample part 43 may consist of a length of tow approximately two feet long which is doubled and attached to the drum 9 with its doubled end beneath the locking bar. Care should be exercised to insure an even distribution of the fibers across the drum surface. It will be noted that the pivotal arrangement of the clamp plate 29 permits the locking bar 39 to be placed directly against the sample part 43 without any sliding movement thereacross and thus there is no tendency for the sample part to be displaced laterally of the drum periphery. The drum 9 is then turned to its starting position shown in FIGURE 1 and once again engaged with the change gears.

The second sample part 45 is then secured to the measuring head 47, and in the case of testing continuous fibers, consists of a length of tow approximately four feet long which is doubled over the measuring head hook 49. To the free end of the sample part 45, the weight 57 is attached, and here again it is imperative that the sample be evenly distributed across the clamp and that no slack or loopy fibers are present. Once the sample part 45 is draped over the sample part 43 on the drum periphery, as shown in FIGURE 1, the motor 15 may be started and the recorder placed in operation to commence the test procedure.

Figure 2:
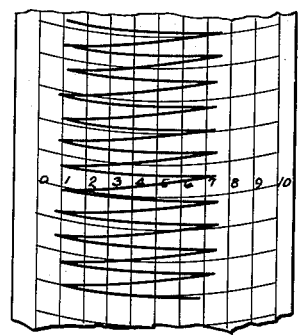
FIGURE 2 illustrates a fragmentary portion of a typical chart obtained during one form of test procedure carried out on the apparatus shown in FIGURE 1.

Initially, the sample parts are in an equilibrium state in which the tension $T_1$ in the horizontal leg of the sample 45 plus the force of the static friction $F_s$ between the sample parts together are greater than the tension $T_2$ applied by the weight 57. As the drum rotates in the direction shown in FIGURE 1, the friction between the sample parts causes the weight 57 to be raised, thus reducing the pull or tension $T_1$ on the strain gauges, which in turn effects movement of the pen 59 toward the left edge of the chart. This lifting movement of the weight 57 continues until the sum of the tension $T_1$ plus the static friction $F_s$ is slightly less than the tension $T_2$ caused by the weight 57. At this instant, the sample part 45 slips downwardly relative to the sample part 43 to its initial starting position. During this slipping movement, the static friction $F_s$ immediately changes to a kinetic frictional force $F_k$ and the tension $T_1$ starts and continues to increase until the tension $T_1$ plus the kinetic friction force $F_k$ equals the tension $T_2$ plus the impact force. Also during this slipping movement of the sample part, the recorder pen 59 swings toward the right edge of the chart. At the instant slipping of the sample part 45 stops, the kinetic friction force $F_k$ immediately returns to a static friction force $F_s$ and the drum once again begins to lift the sample part 45 to commence the second test cycle. The test procedure is continued for a number of cycles, or until the drum moves through a maximum of 120°, to provide a chart as shown in FIGURE 2, wherein the series of points along the left edge of the zig-zag line are a measure of the tension $T_1$ when slipping of the sample part 45 starts, while the series of points along the right edge of the zig-zag line are a measure of $T_1$ when slipping stops.

Chart interpretation is facilitated by employing the known equation developed for use in brake band studies as follows:

$$\frac{T_2}{T_1} = e^{\mu \alpha}$$

where $T_2$ is the tension on the tight side of the band, and corresponds to the tension $T_2$ applied to the sample part 45 by the weight 57; $T_1$ is the tension on the loose side of the band, and corresponds to the tension in the horizontal leg of the sample part 45 at the instant the sample part is about to slip; $e$ is equal to 2,718 (base of Naperian log system); $\mu$ is the coefficient of static friction at the point where slipping starts; and $\alpha$ the angle of wrap about the drum in radians, and which, as shown in FIGURE 1 is equal to 90° or 1.5708 radians.

It will be noted that all the terms of the above noted equation are constants with the exception of $T_1$ which, as heretofore mentioned, are indicated by the series of points at the left edge of the zig-zag line of the chart. Thus, the above noted equation can be solved for an average value of the static coefficient of friction $\mu$ of the particular sample tested by merely inserting the mean value of $T_1$ as obtained from left edge of the zig-zag line on the recorder chart.

Figure 4:
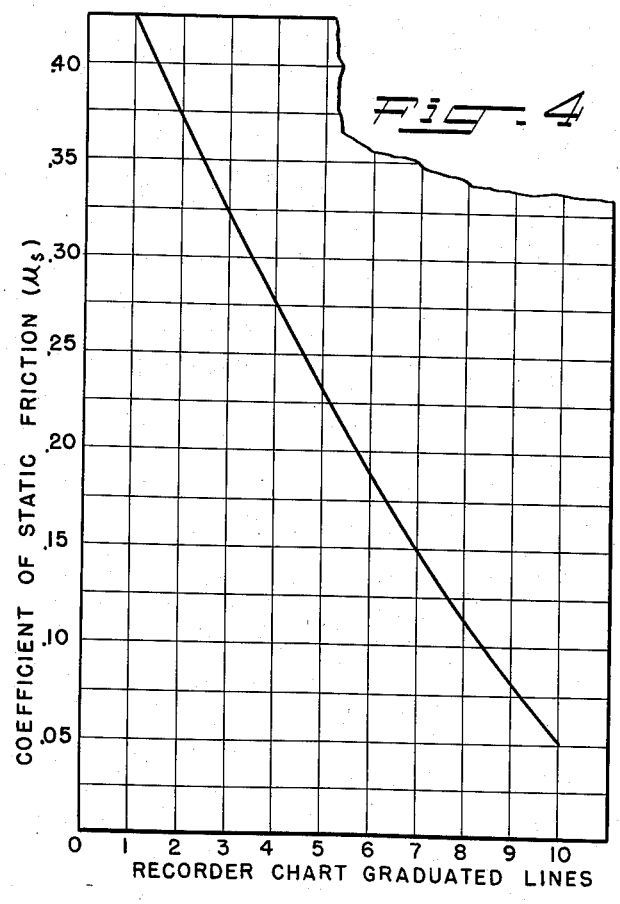
FIGURE 4 is a graphical representation of the range of coefficient of friction values covered by a recorder chart such as shown in FIGURE 2.

In FIGURE 4, there is illustrated a graphical representation of the values of static coefficient of friction covered by a recorder chart, and is prepared by using various values for $T_1$ in the above noted equation. It is evident that the graph of FIGURE 3 serves to make interpretation of the recorder charts, such as shown in FIGURE 2, a simple matter. With the sample graph shown, the operator needs only to determine the chart graduated line which passes through the point or points at the left edge of the zig-zag line, follow the corresponding graduated line upwardly from the bottom edge of the graph to its point of intersection with the curve, and then read the coefficient of static friction value along the left edge of the graph.

In addition to providing a rapid and reliable means by which the static coefficient of friction of a sample can be determined, the zig-zag line gives a visual picture of the stick-slip range of the material tested, which can be stated in terms of its amplitude as defined by the number of graduated lines of the chart which is covers.

In comparing the procedure of the present invention with the time honored testing method of squeezing a fiber sample by hand, it will be recognized that the apparatus here described provides more accurate and informative results in view of its sensitivity and its ability to separate the relative effect of the level of the coefficient of static friction and the stick-slip range. Thus, the present invention enables one to differentiate between a sample having a low static coefficient of friction and a wide stick-slip range and another sample having a higher coefficient of static friction and a narrower stick-slip range, which was not heretofore possible with the hand test procedure.

Figure 3:
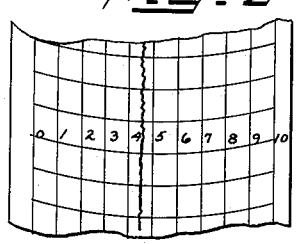
FIGURE 3 is a view similar to FIGURE 2 showing a typical chart obtained during a dynamic friction test.

As heretofore mentioned, the apparatus of the present invention is also adapted for determining the dynamic frictional properties of materials. In the case of fibrous materials, one of the sample parts, corresponding to the sample part 43, is secured to a plain cylindrical drum 9 by any suitable means, while the second sample part, similar to part 45 is connected at one end of the strain measuring head 47 and then draped over the first sample part. A weight, which may be either heavier or lighter than the weight 57 heretofore mentioned, is clamped to the free end of the second sample part after which the drum is caused to turn at a constant speed and in a clockwise direction, as viewed in FIGURE 1. The speed of the drum during the dynamic friction testing is above that employed with the test procedure described previously. With the recorder properly calibrated in a manner as heretofore noted, a substantially straight line is drawn on the recorder chart by the pen 59, as shown in FIGURE 3.

The dynamic coefficient of friction of the test materials, under the particular test conditions employed, can be determined by employing the conventional formula as follows:

$$\mu \alpha = \frac{P}{R}$$

where $\mu \alpha$ is the dynamic coefficient of friction; P the total pressure with which the second sample part acts against the first sample part during their entire arcuate path of engagement; and R the force or pull acting on the second sample part as the first sample part is moved relative thereto. As understood by those skilled in the art, the value for P is obtained by mathematical calculation while R is read from the chart along the graduate line numbered from 0 to 10 in FIGURE 3. It will be apparent that by merely inserting the values of P and R into the formula the dynamic coefficient of friction for the particular sample then undergoing study can be easily determined.

While the above described illustrative examples have been directed to testing fibrous material of substantial length along a direction extending axially or longitudinally thereof, the inventive teachings are equally well adapted for determining the frictional properties of materials when tested across or transversely of their axis or length. In practice a double-faced pressure sensitive tape is applied to the periphery of a plain drum after which the fibrous material is pressed onto the exposed face of the tape along a direction parallel to the drum axis. The second sample part may be attached to the measuring head 47 and weighted as heretofore described or may also be pressed onto the face of pressure sensitive tape, which in turn is draped over the first sample part, connected to the head 47, and weighted. In this last mentioned procedure, the fibers of both sample parts extend in the same direction, that is substantially parallel to the drum axis.

It will be recognized that the use of pressure sensitive tape, or equivalent means enables the apparatus of the present invention to be used in friction testing of relatively short fibers, such as carded staple, sliver, roving, and also non-woven fabrics.

In the textile industry the apparatus of the present invention facilitates a more rapid and reliable study of the friction characteristics of fibers such as:

(1) The surface friction characteristics of fibers most suitable for the particular mechanical processing to which the fibers are to be subjected.

(2) The effect on surface friction characteristics of various finishes, dulling agents, and dyes and the effect caused by variation in the amounts of the liquid treatment applied.

(3) The effect of temperature and humidity, and the degree, rate and temperature of fiber dyeing on the frictional characteristics.

(4) The uniformity of finish application as a means of production control.

From the above description it will be apparent that the apparatus described enables numerous test procedures to be carried out on a plant or production basis. Further, the inventive teachings are equally well adapted for use with a variety of material removed from the textile industry and which need not be flexible in character. For example, the drum itself or coating applied to the drum periphery may constitute one of the sample materials undergoing study, as may occur, for instance, when testing bearing or abrasive substances.

It is seen from the above description that the objects of the invention are well fulfilled by the apparatus described. The description is intended to be illustrative only and it is to be understood that changes and variations may be made without departing from the spirit and scope of the invention as defined by the appended claims.

We claim:

1. Apparatus for use in determining the frictional properties of materials including a drum mounted for rotation, means for attaching a first sample part to the periphery of said drum, a strain measuring device having means for attaching to one end of a second sample part disposed over the drum and first sample part attached thereto, said last-mentioned means being mounted for movement along a fixed plane tangent to the drum periphery, means mounted for movement in a second fixed plane tangent to said drum periphery for applying tension to the end of the second sample part remote from said strain measuring device, and means for rotating said drum.

2. Apparatus as defined in claim 1 wherein said means of the strain measuring device is movable along a horizontal plane and said tensioning means is a predetermined weight which is movable along a vertical plane.

References Cited in the file of this patent

UNITED STATES PATENTS

| | | |
|---|---|---|
| 1,902,594 | Thomas | Mar. 21, 1933 |
| 2,378,614 | Zahn | June 19, 1945 |
| 2,561,133 | Petkewicz | July 17, 1957 |

FOREIGN PATENTS

| | | |
|---|---|---|
| 895,287 | France | Mar. 27, 1944 |
| 622,773 | Germany | Dec. 5, 1935 |

OTHER REFERENCES

Journal of the Textile Institute, G. King, vol. 41, pages T135–T144, 1950.